United States Patent
Suekuni

(10) Patent No.: US 6,259,661 B1
(45) Date of Patent: *Jul. 10, 2001

(54) DISK READING APPARATUS WITH ROTARY SPEED ADJUSTMENT FEATURE

(75) Inventor: Masato Suekuni, Osaka (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,718

(22) Filed: Jul. 15, 1998

(30) Foreign Application Priority Data

Jul. 16, 1997 (JP) .................................. 9-006241

(51) Int. Cl.[7] ...................................................... G11B 7/00
(52) U.S. Cl. .................................... 369/47.44; 369/47.45; 369/53.13; 369/53.14; 369/53.18
(58) Field of Search ................................. 369/32, 50, 59, 369/58, 54, 47, 53

(56) References Cited

U.S. PATENT DOCUMENTS

| | | | |
|---|---|---|---|
| 5,202,872 | * | 4/1993 | Shinada ................................ 369/47 |
| 5,668,789 | * | 9/1997 | Yokota et al. ...................... 369/47 |
| 6,009,053 | * | 12/1999 | Ota et al. ............................ 369/50 |
| 6,016,296 | * | 1/2000 | Kim .................................... 369/50 |

FOREIGN PATENT DOCUMENTS

| | | |
|---|---|---|
| 4-143928 | 5/1992 | (JP) . |
| 7-184386 | 7/1995 | (JP) . |
| 8-106714 | 4/1996 | (JP) . |

OTHER PUBLICATIONS

008929 Japan technical evaluation for Utility Model (Search Report) and partial translation thereof.

* cited by examiner

Primary Examiner—Nabil Hindi
(74) Attorney, Agent, or Firm—Lackenbach Siegel Marzullo Aronson & Greenspan

(57) ABSTRACT

A disk reading apparatus for reading data recorded on a disk medium is disclosed. The disk reading apparatus comprises a motor for rotating the disk medium, a vibration sensor section for detecting vibrations generating inside the disk reading apparatus and for converting the vibrations into a signal, a binarized signal generation section for extracting only a frequency component corresponding to the rotary speed of the disk medium from the signal outputted from the vibration sensor section, and for outputting a signal in which a binaraization is performed, a vibration judgement section for measuring a period of the binarized signal outputted from the binarized signal generation section and for outputting a vibration detection signal when the period of the binarized signal corresponds to the rotary speed of the disk medium, and a rotation control section for lowering the rotary speed of the disk medium when the vibration detection signal is inputted.

6 Claims, 2 Drawing Sheets

DISK READING APPARATUS WITH ROTARY SPEED ADJUSTMENT FEATURE

BACKGROUND OF THE INVENTION

1. Technical Field of the Invention

The present invention relates to an apparatus for reading a disk, such as CD-ROM, CD-R, DVD-ROM, DVD-RAM, etc., in which digital data have been recorded in a spiral track, and particularly relates to a disk reading apparatus by which the rotary speed of the disk is lowered when vibration is generated due to eccentric center of gravity of the disk.

2. Background of the Related Art

In a disk reading apparatus for reading data from a CD-ROM, in order to shorten the time taken to read data, the CD-ROM is rotated to read the data at a speed higher than a normal speed, for example, at a 8-fold speed, a 16-fold speed, or the like. On the other hand, the specification regarding the eccentric center of gravity of the CD-ROM is set to a value which causes no problem in reading data in the condition that the CD-ROM is rotated at the normal speed. Therefore, when the CD-ROM is rotated at a speed higher than the normal speed, there may be a case where the eccentric center of gravity becomes strongly influential to increase the quantity of vibration to thereby cause a difficulty in data-reading. In the case where a CD-ROM is rotated at a high speed, therefore, it is detected whether vibration is generated or not so that the rotary speed can be lowered to read data when vibration is detected.

To this end, conventionally, Unexamined Japanese Patent Publication No. Hei-4-143928 has proposed a technique in which whether vibration is generated or not is detected when a disk is rotated. That is, in this technique, mechanical vibration of a rotation driving section for rotating a disk is detected by means of a sensor. The output of the sensor is fed to a band-pass filter, while the frequency of the band-pass filter is set to a frequency corresponding to the rotary speed of the disk. Accordingly, only a frequency component corresponding to the rotary speed of the disk is outputted from the band-pass filter. The signal outputted from the band-pass filter is led to a window comparator in which the signal is binarized and supplied to the external section as an abnormal detection signal.

When the above-mentioned configuration is adopted, however, a problem had arisen as follows. That is, when an external impact was given to the reader, strong vibration was generated in the reading apparatus. This strong vibration was detected by the sensor. On the other hand, the attenuation property of the band-pass filter became comparatively gentle so as to be about 6 dB/octave when the circuit configuration was simplified. Therefore, when a frequency component near the pass frequency of the band-pass filter was included in the output of the sensor detecting the vibration caused by the impact, an abnormal detection signal was outputted due to the impact. Therefore, in a situation where a portion of a human body or the like hit against a desk on which the reading apparatus was located to give an impact to the apparatus, an abnormal detection signal was sent out. Accordingly, notwithstanding the capability of being read at a high rotary speed, the disk was read at a low rotary speed so that the reading speed was thus lowered.

SUMMARY OF THE INVENTION

To solve the foregoing problem, therefore, the first object of the present invention, to provide a disk reading apparatus in which a period of a binarized signal is detected, and it is judged that vibration is generated by eccentric center of gravity when the detected period corresponds to the rotary speed of the disk, so that it is possible to prevent erroneous conclusion from occurring in the judgement of vibration due to the eccentric center of gravity.

In addition, the second object of the present invention is to provide a disk reading apparatus wherein it is possible to simplify the configuration of the binarization circuit in which only a frequency component corresponding to the rotary speed of the disk is allowed to pass.

To achieve the first object of the present invention, there is provided a disk reading apparatus for reading data recorded on a disk medium which comprises: a motor for rotating the disk medium; a vibration sensor section for detecting vibrations generating inside the disk reading apparatus and for converting the vibrations into a signal; a binarized signal generation section for extracting only a frequency component corresponding to the rotary speed of the disk medium from the signal outputted from the vibration sensor section, and for outputting a signal in which a binaraization is performed, a vibration judgement section for measuring a period of the binarized signal outputted from the binarized signal generation section and for outputting a vibration detection signal when the period of the binarized signal corresponds to the rotary speed of the disk medium; and a rotation control section for lowering the rotary speed of the disk medium when the vibration detection signal is inputted.

That is, the binarized signal generation section extracts only a frequency component corresponding to the rotary speed of the disk from the output of the vibration sensor section. The binarized signal generation section binarizes the extracted component. Accordingly, a binarized output is sent out from the binarized signal generation section in accordance with the vibration caused by the impact when a frequency component of vibration caused by an external impact includes a component near the frequency corresponding to the rotary speed of the disk. On the other hand, the vibration judgement section sends out a vibration detection output when the period of the binarized output corresponds to the rotary speed of the disk. This means that no vibration detection output is sent out when the period of the binarized output is near the period corresponding to the rotary speed of the disk. Accordingly, no vibration detection output is sent out when vibration is generated by an external impact.

In addition, according to the present invention, the binarized signal generation section includes: an amplifier circuit amplifying the output signal from the vibration sensor section; a transistor binarizing an output of the amplifier circuit; a high-pass filter connected between an output terminal of the amplifier circuit and a base of the transistor, and constituted by a series connection of a capacitor and a resistor; and a low-pass filter constituted by a load resistor connected between a collector of the transistor and a positive power source, and an integrating capacitor connected between the collector and a ground level, and wherein a central frequency of band-pass characteristic constituted by the high-pass filter and the low-pass filter is made to be a frequency corresponding to the rotary speed of the disk medium.

That is, the resistor connected between the output terminal of the amplifier circuit and the base, and the load resistor connected between the collector and the positive power source are elements indispensable to cause the transistor connected to the output of the amplifier circuit to perform binarization. On the other hand, the high-pass filter is connected between the output terminal of the amplifier circuit and the base, and constituted by a series connection of a capacitor and a resistor. The low-pass filter is constituted by a load resistor connected between the collector and the positive power source, and an integrating capacitor connected between the collector and the ground level. That is, the high-pass filter and the low-pass filter are constituted by the resistors which are indispensable elements and the capacitors combined with those resistors. That is, by adding only two capacitors to the indispensable resistors, a required band-pass characteristic can be obtained.

DETAILED DESCRIPTION OF THE PREFERRED EMBODIMENT

One preferred embodiment of the present invention will be given below in detail with reference to the drawings.

Figure 1:
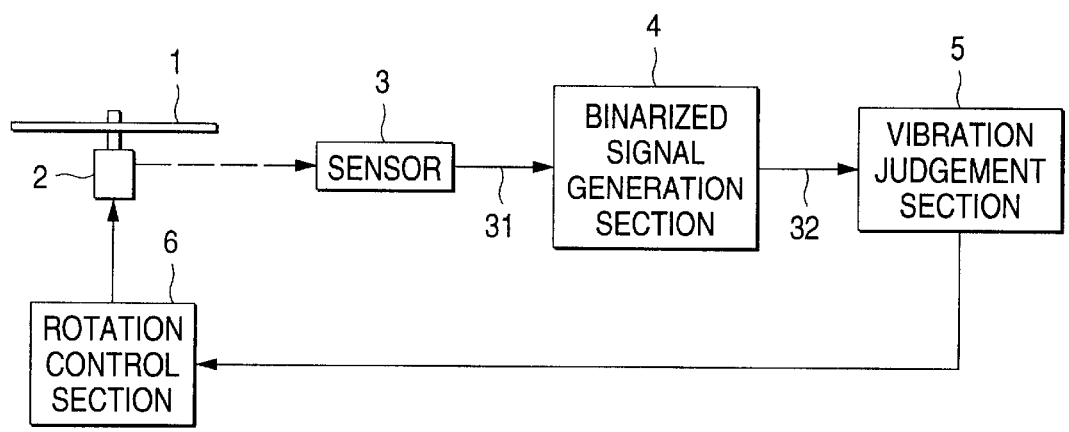
FIG. 1 is a block diagram illustrating an electric configuration of one embodiment of a disk reading apparatus according to the present invention.

FIG. 1 is a block diagram illustrating an electric configuration of one embodiment of the disk reading apparatus according to the present invention.

In FIG. 1, a disk 1 is a disk in which digital data have been recorded along a spiral track. Specifically, the disk 1 may be a CD-ROM.

A spindle motor 2 is a motor for rotating the disk 1, and the rotary speed thereof is controlled by a rotation control section 6.

A sensor section 3 is designed to detect vibration generated by eccentric center of gravity of the disk 1 when the disk 1 is rotated by the spindle motor 2, and to supply a detection signal as an output signal 31 to a binarized signal generation section 4. The sensor section 3 is attached to a substrate provided inside an apparatus body (not-shown), together with discrete elements, ICs, or the like, which are constituting the binarized signal generation section 4, a vibration judgement section 5, and so on.

The binarized signal generation section 4 is designed to extract only a frequency component corresponding to the rotary speed of the disk 1 from the output signal 31 from the sensor section 3, and to binarize the extracted component. A binarized output signal 32 obtained by the binarization is supplied to the vibration judgement section 5.

The vibration judgement section 5 is designed to detect the period of the binarized output signal 32 supplied from the binarized signal generation section 4, and to supply a vibration detection output to the rotation control section 6 when the detected period corresponds to the rotary speed of the disk 1.

The rotation control section 6 is designed to control the rotary speed of the spindle motor 2. That is, the rotation control section 6 controls the spindle motor 2 to rotate at a rotary speed (about 83 revolutions per second) which is 16 times as high as a normal rotary speed. In addition, if the vibration detection output is supplied from the vibration judgement section 5 while the spindle motor 2 is rotated at the 16-fold rotary speed, the rotation control section 6 controls the spindle motor 2 to reduce the rotary speed so that the spindle motor 2 rotates at a rotary speed which is 4 times as high as the normal rotary speed. On the other hand, if no vibration detection output is supplied from the vibration judgement section 5 while the spindle motor 2 is rotated at the 16-fold rotary speed, the rotation control section 6 continues to control the spindle motor 2 so as to make the spindle motor 2 rotate at the 16-fold rotary speed.

Main portions of the vibration judgement section 5 and the rotation control section 6 are constituted by a microcomputer.

Figure 2:
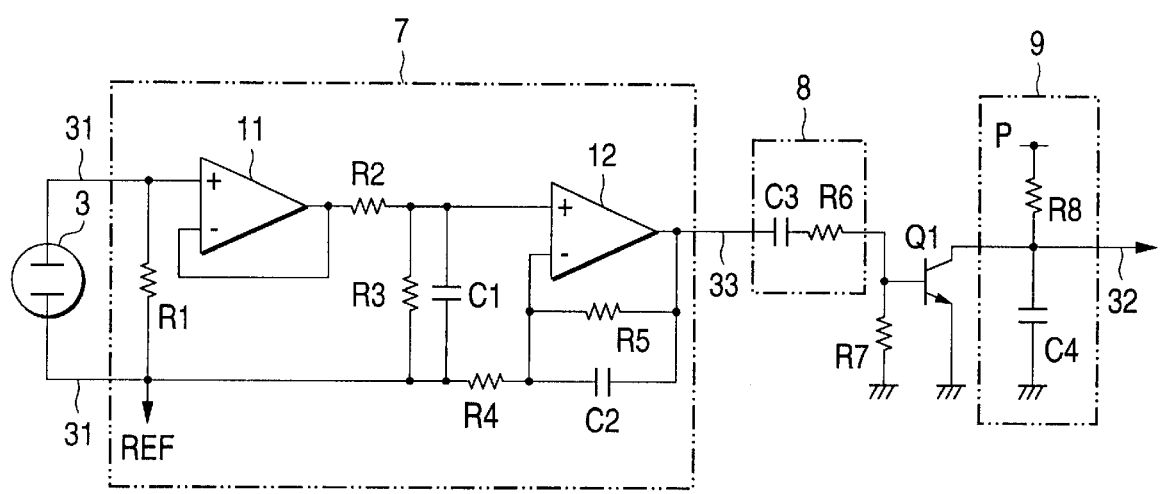
FIG. 2 is a circuit diagram illustrating an electric connection of a binarized signal generation section in detail.

FIG. 2 is a circuit diagram illustrating the electric connection of the binarized signal generation section 4 in detail.

The binarized signal generation section 4 is constituted, roughly, by an amplifier circuit 7 for amplifying the output signal 31 of the sensor section 3, a transistor Q1 for binarizing the output signal of the amplifier circuit 7, a high-pass filter 8 connected between an output terminal 33 of the amplifier circuit 7 and the base of the transistor Q1, and a low-pass filter 9 connected to the collector of the transistor Q1. The central frequency of the band-pass characteristic constituted by the high-pass filter 8 and the low-pass filter 9 is set to 83 Hz corresponding to the rotary speed (about 83 revolutions per second) of the disk 1.

The respective sections will be described below in detail.

One of the output signal 31 of the sensor section 3 is led to a positive input of an amplifier 11. The other of the output signal 31 of the sensor section 3 is connected to a reference voltage source REF. The positive input of the amplifier 11 is connected to the reference voltage source REF through a resistor R1. A negative input terminal and an output terminal of the amplifier 11 are connected to each other. That is, the amplifier 11 operates as a buffer for converting the output signal 31 of the sensor section 3 into a low-impedance signal.

The output terminal of the amplifier 11 is led to a positive input terminal of an amplifier 12 through a resistor R2. A negative input terminal of the amplifier 12 is connected to the reference voltage source REF through a resistor R4. A resistor R3 and a capacitor C1 are connected between the positive input terminal of the amplifier 12 and the reference voltage source REF. On the other hand, a resistor R5 and a capacitor C2 are connected between the negative input terminal and an output terminal of the amplifier 12. The resistor R2, the resistor R3, the capacitor C1 and the capacitor C2 are elements for preventing parasitic oscillation of the amplifier 12. The ratio of the resistance value of the resistor R4 to that of the resistor R5 is set so that a gain factor of the amplifier 12 becomes about 500.

The high-pass filter 8 is constituted by a series circuit of a capacitor C3 and a resistor R6. Therefore, one terminal of the capacitor C3 is connected to an output terminal 33 of the amplifier circuit 7, and the other terminal of the capacitor C3 is connected to one terminal of the resistor R6. The other terminal of the resistor R6 is connected to the base of the transistor Q1. A resistor R7 is connected between the base of the transistor Q1 and the ground level in order to prevent the base from being opened. The emitter of the transistor Q1 is connected to the ground level.

The low-pass filter 9 is constituted by a load resistor R8 and an integrating capacitor C4. Therefore, one terminal of the load resistor R8 is connected to a positive power source P, while the other terminal of the load resistor R8 is connected to the collector of the transistor Q1. One terminal of the integrating capacitor C4 is connected to the collector of the transistor Q1, while the other terminal of the integrating capacitor C4 is connected to the ground level. The output at the collector of the transistor Q1 is supplied, as a binarized output signal 32, to the vibration judgement section 5.

The resistor R6 constituting the high-pass filter 8 is used also as an element for limiting a base current of the transistor Q1. The load resistor R8 constituting the low-pass filter 9 is used also as a load resistor for the collector of the transistor Q1. That is, according to this structure, a predetermined band-pass characteristic can be obtained only by adding the two capacitors C3 and C4.

The reference voltage source REF generates a voltage which is a half of that of the positive power source P. Although it is not shown, the amplifiers 11 and 12 are connected to and operated by a single power source, that is, by the positive power source P.

Figure 3:
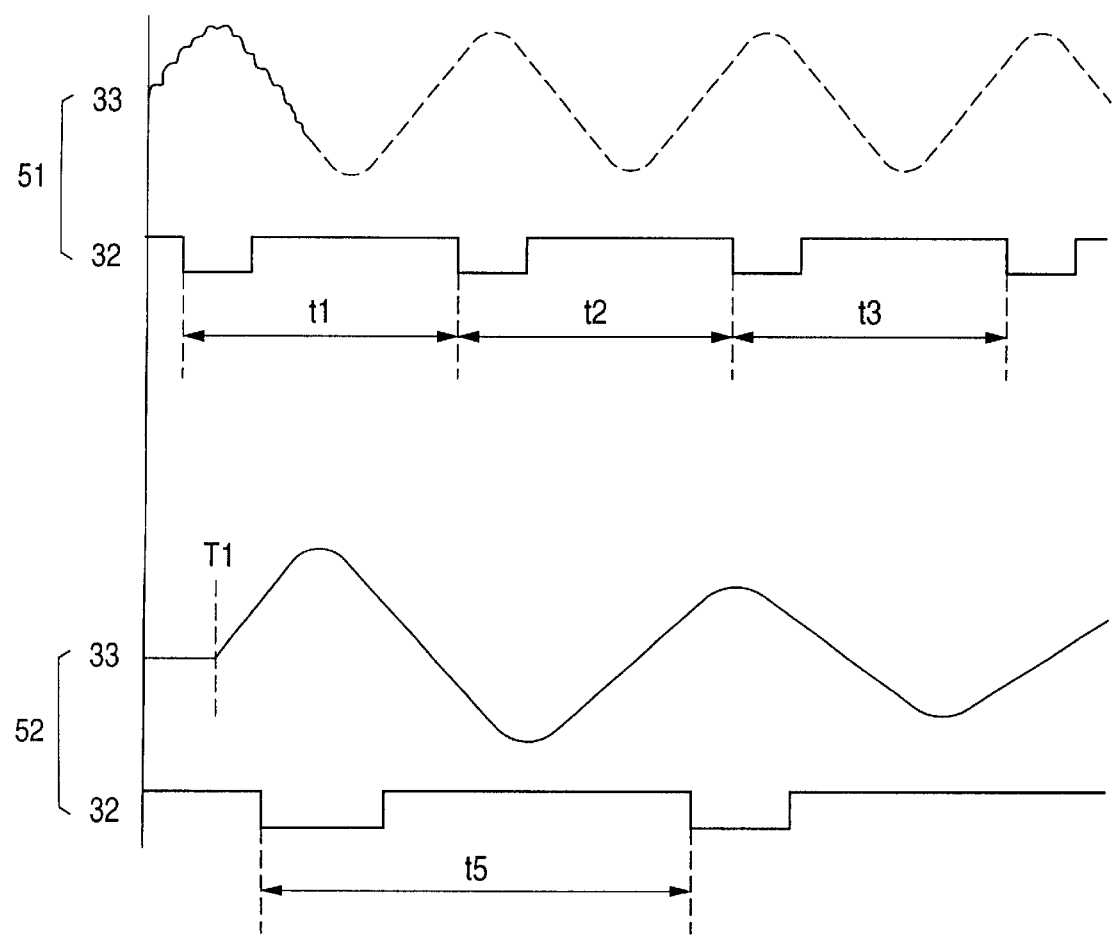
FIG. 3 a timing chart showing waveforms of main signals in the embodiment.

FIG. 3 is a timing chart showing waveforms of main signals. The operation of this embodiment will be described with reference to FIG. 3 as occasion demands. Two kinds of signal waveforms indicated by the reference numeral 51 in FIG. 3 show waveforms in the case where vibration is generated due to the eccentric center of gravity of the disk 1. On the other hand, the two kinds of waveforms indicated by the reference numeral 52 show waveforms in the case where an external impact is given to the apparatus body.

The rotation control section 6 controls the spindle motor 2 to rotate at a rotary speed which is 16 times as high as the normal speed in order to read data from the disk 1 at a high speed. At this time, if the eccentric center of gravity of the disk 1 is large, the rotation axis of the spindle motor 2 vibrates. The vibration of the rotation axis of the spindle motor 2 is transmitted to the substrate through the apparatus body, and detected by the sensor section 3. In the following description, the waveforms denoted by the reference numeral 51 are referred to.

The waveform denoted by 33 in FIG. 3 appears at the output terminal 33 of the amplifier circuit 7 for amplifying the output signal 31 of the sensor section 3. That is, there appears a waveform in which vibration due to the eccentric center of gravity of the disk 1 (vibration with a large amplitude and a long period) is added to mechanical vibration, or the like, generated by the spindle motor 2 per se (vibration with a small amplitude and a short period). Only a frequency component of 83 Hz corresponding to the rotary speed of the disk 1 is extracted as a pulse from the composite waveform denoted by 33, by the band-pass characteristic formed by the high-pass filter 8 and the low-pass filter 9, in addition to the effect of binarization of the transistor Q1. That is, a pulse 32 taking an L level in a period where the level of the output terminal 33 becomes high appears at the binarized output signal 32. Since the rotary speed of the disk 1 is about 83 revolutions per second, the period t1, t2, t3, . . . of the pulse is about 12 msec.

The vibration judgement section 5 measures the period t1, t2, t3, . . . of the pulse appearing at the binarized output signal 32. The period t1, t2, t3, . . . is about 12 msec, at this time, correspondingly to the rotary speed of the disk 1. Therefore, the vibration judgement section 5 judges that the eccentricity of center of gravity of the disk 1 is so large that vibration causing a trouble in reading is generated, and the vibration judgement section 5 supplies a vibration detection output to the rotation control section 6. Upon reception of the vibration detection output, the rotation control section 6 lowers the rotary speed of the spindle motor 2. That is, the rotation control section 6 controls the spindle motor 2 to rotate at a speed 4 times as high as the normal rotary speed. Therefore, thereafter, data are read while the disk 1 is rotated at the speed 4 times as high as the normal rotary speed.

If the eccentricity of the center of gravity of the disk is small and the vibration is very small when the disk 1 is rotated at the 16-fold rotary speed, the waveform of the output terminal 33 has a small amplitude. Accordingly, the transistor Q1 stays in an OFF state, so that no pulse of the L level appears in the binarized output signal 32. When no pulse of the L level appears in the binarized output signal 32, the vibration judgement section 5 does not send out the vibration detection output. If the vibration judgement section 5 does not send out a vibration detection output, the rotation control section 6 continues to control the spindle motor 2 to rotate at the 16-fold rotary speed. Accordingly, thereafter, data are read while the disk 1 is rotated at the 16-fold speed.

The operation in the case where the external impact is given to the apparatus body will be described below with reference to the waveforms denoted by the reference numeral 52 in FIG. 3.

Assume that the disk 1 is being rotated at the 16-fold speed, and the vibration judgement section 5 judges whether the disk 1 is vibrating or not. Then, assume that some accidents occur at the time T1 during judgment, for example, a human body hits against the desk, or the like, so that an external impact is given to the apparatus body. Vibration is therefore generated in the apparatus body by the impact given thereto. The vibration generated in the apparatus body is detected by the sensor section 3. The output signal 31 of the sensor section 3 is amplified by the amplifier circuit 7. Assume that the signal waveform appearing at the output terminal 33 of the amplifier circuit 7 takes a waveform denoted by the reference numeral 33 in FIG. 3, which shows only a frequency component near 83 Hz extracted by the band-pass filter from a complicated waveform caused by the impact.

In accordance with the signal component near 83 Hz which is the central frequency of the band-pass filter, a pulse of the L level with the period t5, . . . appears in the binarized output signal 32. The pulse of the L level with the period t5, . . . is led to the vibration judgement section 5. The vibration judgement section 5 measures the period t5, . . . of the pulse appearing at the binarized output signal 32. The period t5 obtained at this time takes a value longer than 12 msec. Therefore, the pulse appears at the binarized output signal 32, nevertheless the vibration judgement section 5 judges that the appearing pulse is not a pulse caused by the large eccentric center of gravity of the disk 1. Therefore, the vibration judgement section 5 does not send out the vibration detection output. Accordingly, the rotation control section 6 continues to control the disk 1 to rotate 1 at the 16-fold speed. Consequently, thereafter, data are read while the disk 1 is rotated at the 16-fold speed.

The present invention is not limited to the above-mentioned embodiment without departing from the spirit and scope of the invention. Although description is made about the case where the disk 1 is a CD-ROM, the present invention is applicable also to a disk supplied under the abbreviated name of DVD, a disk supplied under the abbreviated name of MD, and so on, in the same manner as that described above.

As has been discussed heretofore, according to the present invention, the disk reading apparatus comprises: a motor for rotating the disk medium; a sensor for detecting vibrations generating inside the disk reading apparatus and for converting the vibrations into a signal; a binarized signal generation section for extracting only a frequency component corresponding to the rotary speed of the disk from the signal outputted from the sensor, and for outputting a signal in which a binaraization is performed; a vibration judgement section for measuring a period of the binarized signal outputted from the binarized signal generation section and for outputting a vibration detection signal when the period of the binarized signal corresponds to the rotary speed of the disk; and a rotation control section for lowering the rotary speed of the disk when the vibration detection signal is inputted.

That is, only a frequency component corresponding to the rotary speed of the disk is extracted from the output of the sensor, and the extracted frequency component is binarized. Further, when the period of the binarized output becomes a value corresponding to the rotary speed of the disk, it is judged that vibration is caused by eccentric center of gravity of the disk. It is therefore possible to avoid an erroneous judgment with respect to the vibration generated by eccentric center of gravity.

In addition, according to the present invention, the binarized signal generation section includes: an amplifier circuit amplifying the output signal from the vibration sensor section; a transistor binarizing an output of the amplifier circuit; a high-pass filter connected between an output terminal of the amplifier circuit and a base of the transistor, and constituted by a series connection of a capacitor and a resistor; and a low-pass filter constituted by a load resistor connected between a collector of the transistor and a positive power source, and an integrating capacitor connected between the collector and a ground level, and wherein a central frequency of band-pass characteristic constituted by the high-pass filter and the low-pass filter is made to be a frequency corresponding to the rotary speed of the disk.

That is, the high-pass filter and the low-pass filter are constituted by combining the indispensable resistors with capacitors. That is, since required band-pass characteristic can be obtained by adding only two capacitors, it is possible to simplify the configuration of the binarization circuit in which binarization is performed by passing only a frequency component corresponding to the rotary speed of the disk.

What is claimed is:

1. A disk reading apparatus for reading data recorded on a disk medium, comprising:
   a motor for rotating the disk medium;
   a vibration sensor section for detecting vibrations generated inside the disk reading apparatus and for converting the vibrations into a signal;
   a binarized signal generation section for extracting only a frequency component corresponding to the rotary speed of the disk medium from the signal outputted from the vibration sensor section, and for outputting a signal in which a binarization is performed;
   a vibration judgement section for:
   measuring a period of the binarized signal outputted from the binarized signal generation section to distinguish between the vibrations resulting from an eccentricity of the disk medium and the vibrations caused by external impact; and
   outputting a vibration detection signal when the period of the binarized signal corresponds to the vibrations resulting from the eccentricity of the disk medium; and
   a rotation control section for lowering the rotary speed of the disk medium when the vibration detection signal is inputted.

2. The disk reading apparatus as set forth in claim 1, wherein the binarized signal generation section includes:
   an amplifier circuit amplifying the output signal from the vibration sensor section;
   a transistor binarizing an output of the amplifier circuit;
   a high-pass filter connected between an output terminal of the amplifier circuit and a base of the transistor, and constituted by a series connection of a capacitor and a resistor; and
   a low-pass filter constituted by a load resistor connected between a collector of the transistor and a positive power source, and an integrating capacitor connected between the collector and a ground level, and
   wherein a central frequency of band-pass characteristic constituted by the high-pass filter and the low-pass filter is made to be a frequency corresponding to the rotary speed of the disk medium.

3. The disk reading apparatus as set forth in claim 1, wherein the vibration judgement section outputs the vibration detection signal when a period while the disk medium rotates once is substantially same as the period of the binarized signal.

4. A method for avoiding erroneous judgement for vibration generation while reading data recorded on a disk medium, comprising the steps of:
   detecting vibrations generated inside of a disk reading apparatus and converting the vibrations into a signal;
   generating a binarized signal by extracting only a frequency component corresponding to a rotary speed of the disk medium from the signal and performing a binarization to the signal;
   measuring a period of the binarized signal to distinguish between the vibrations resulting from an eccentricity of the disk medium and the vibrations caused by external impact: and
   lowering the rotary speeds of the disk medium when the period of the binarized signal corresponds to the vibrations resulting from the eccentricity of the disk medium.

5. The method for avoiding erroneous judgement for vibration generation while reading data recorded on the disk medium as set forth in claim 4, wherein the step of generating a binarized signal is achieved by:
   an amplifier circuit amplifying the converted signal;
   a transistor binarizing an output of the amplifier circuit;
   a high-pass filter connected between an output terminal of the amplifier circuit and a base of the transistor, and constituted by a series connection of a capacitor and a resistor; and
   a low-pass filter constituted by a load resistor connected between a collector of the transistor and a positive power source, and an integrating capacitor connected between the collector and a ground level, and
   wherein a central frequency of band-pass characteristic constituted by the high-pass filter and the low-pass filter is made to be a frequency corresponding to the rotary speed of the disk medium.

6. The method for avoiding erroneous judgement for vibration generation while reading data recorded on the disk medium as set forth in claim 4, wherein the step of lowering the rotary speed of the disk medium is performed when a period while the disk medium rotates once is substantially same as the period of the binarized signal.

* * * * *